F. L. HEMMER.
NUT LOCK.
APPLICATION FILED JULY 17, 1919.

1,337,700. Patented Apr. 20, 1920.

Inventor
F. L. Hemmer.

UNITED STATES PATENT OFFICE.

FREDERICK L. HEMMER, OF LINCOLN, NEW JERSEY, ASSIGNOR, BY DIRECT AND MESNE ASSIGNMENTS, OF ONE-THIRD TO JOHN L. SCHNEIDER, OF NEW MARKET, NEW JERSEY, AND ONE-THIRD TO MICHAEL AUGUSTUS EGANEY, OF BOUNDBROOK, NEW JERSEY.

NUT-LOCK.

1,337,700.   Specification of Letters Patent.   Patented Apr. 20, 1920.

Application filed July 17, 1919. Serial No. 311,547.

*To all whom it may concern:*

Be it known that I, FREDERICK L. HEMMER, a citizen of the United States, residing at Lincoln, in the county of Middlesex and State of New Jersey, have invented certain new and useful Improvements in Nut-Locks, of which the following is a specification.

This invention relates to nut locks of that type in which the nut is fastened at its base, and the object of the same is to produce a lock including an element which in action is fastened to the threads of the bolt and to the work or to the inner nut, and a second element fastened to the first and to the outer nut so that all parts are fastened tight.

The construction by which this object is carried out is set forth in the following specifications and shown in the drawings wherein—

Figure 2:
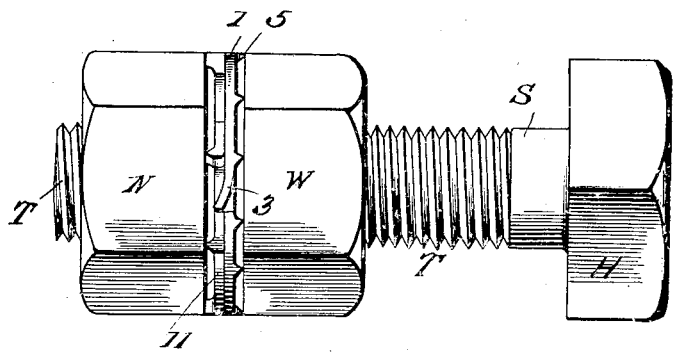
Fig. 2 is a side elevation after said nut is tightened.

The bolt comprises a head H from which projects the shank S, threaded as usual at F, the letter N designating the ordinary nut, and the letter W used in the drawing to designate either the work which is to be clamped between the nut and the head, or as shown in Fig. 2, a second nut which may be used outside the work, or the element W might be a fish plate if this nut were used in a rail joint. The external configuration of the head and the nuts is unimportant, and it is not necessary to this invention that the element W shall screw onto the threads although it is so shown and will be so described.

Figure 3:
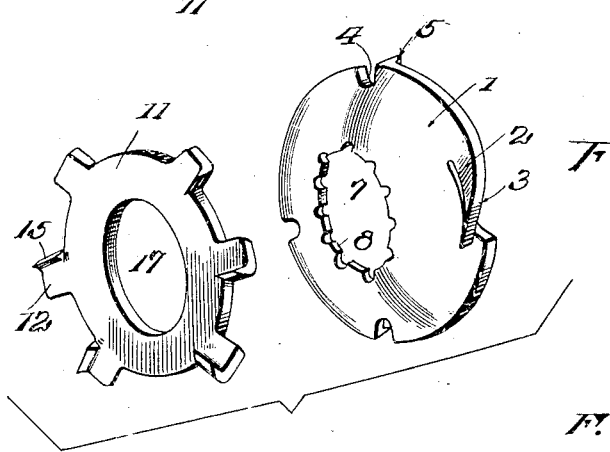
Fig. 3 is a perspective view showing the two washers.

The numeral 1 designates the inner washer which is stamped from sheet metal of such gage that it may be flexed in use, and it is quite possible that the metal may have some little temper, in which case this would be a spring washer. In any event it is cut at at least one point with a slit 2 forming a peripheral tongue 3 bent at its tip as seen in Fig. 2, and the metal alongside the radial end of this slit and also along other slits 4 may be swaged or bent to form projections, teeth or fins 5 at several points around the periphery and extending beyond what will be the inner face of this washer. The body of the washer is cupped or made initially concavo-convex, and its opening 7 is surrounded by notches producing a number of fine teeth 8. In its ordinary or cupped shape as seen in Fig. 3, its opening and its teeth are of such size that a circle intersecting the tips of all said teeth would be slightly larger than the circumference of the bolt-shank S and therefore the circumference of the teeth T, and the opening 7 may be easily slipped onto said shank.

The outer washer is also stamped from sheet metal, but it may be a little heavier. On account of its shape it may be called the star washer, arms 12 projecting radially from its body 11 at several points. Said body is annular, surrounding an opening 17 which is of ample size to slip easily over the threads T. The metal of each arm is swaged or bent on what will be the outer face of this washer into a small pointed tooth, or fin 15, but the entire inner face of the star washer is flat.

Figure 1:
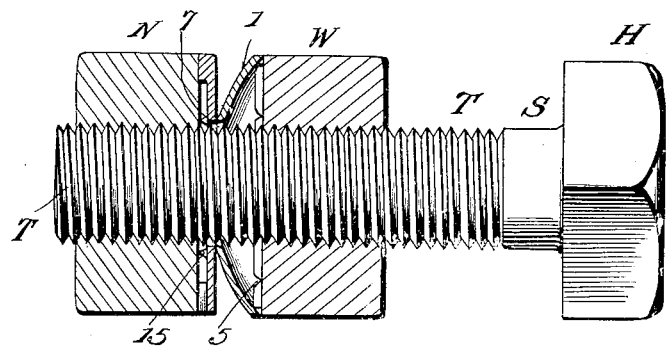
Figure 1 is a sectional view illustrating this device before the nut is set up tight.

The parts are assembled as seen in Fig. 1. The spring washer is put onto the bolt and borne against the inner nut or the work W. Then the star washer 11 is put onto the bolt, and the nut N run onto the same behind this washer. When the two washers come into contact, inward movement of the star washer ceases, or at least is retarded and further tightening up of the nut N causes the fins 15 to embed it so that thereafter the washer 11 turns with the nut. The pressure is communicated to the arched center of the spring washer so that its fins 15 are pressed into the other nut or work W, and therefore this washer will not rotate. Continued advance of the nut and pressure of the outer washer now flattens out the cupped washer and its teeth 8 cut into the corners of the threads T on the bolt. Therefore this washer is locked to the work and to the bolt, while the other washer is locked to the nut. But the flattening out of the spring washer does not flatten its tongue 3, and the same projects out of the plane of the spring washer as seen in Fig. 2; and continued rotation of the star washer causes its arms to pass successively over the tip of its tongue which is inclined in the proper position to permit the turning of the washer to the right, and therefore it checks the turning of the nut and the washer to the left. When a nut so locked is to be removed, it is necessary only to apply sufficient force to it to dislodge it from the teeth or fins 15, and once the nut is off the bolt the washers can be pried off. If the element W shown in Fig. 1 is a second nut, it would in effect become the main nut since it would be screwed up against the work, then the washers applied and finally the nut N applied, and this nut would therefore in effect become the lock or jam nut; yet all parts be locked to each other and to the bolt so that even if the bolt should turn within its hole through the work, the nuts cannot become loose.

Having thus described the invention, what is claimed is:

1. In a nut lock, a continuous unbroken concavo-convex washer having its convex side presented to the nut and provided with inwardly projecting teeth around its opening adapted to indent the threads on the bolt when the washer is flattened by tightening up the nut, and means for permitting the turning of the nut in one direction over the washer but checking its rotation in the other direction.

2. In a nut lock, an unbroken concavo-convex washer having its convex side presented to the nut and provided with inwardly projecting teeth around its opening adapted to indent the corners of the threads on the bolt when the washer is flattened by tightening up the nut, the washer also having fins projecting from the concave side thereof toward the work, and means for permitting the turning of the nut in one direction over the washer but checking its rotation in the other direction.

3. A nut lock comprising a bolt having a threaded shank, a nut screwed thereon, a washer between the nut and the work, the body of the washer being unbroken and cupped with its convex side toward the nut, fins projecting from the periphery of its concave side toward the work, teeth within this opening to engage the threads of the bolt when it is flattened out under pressure, and means on its convex side for permitting forward but preventing retrograde rotation of the nut.

4. In a nut lock, the combination with a bolt having a threaded shank, and a nut screwed thereon; of a star-washer next the nut, a cupped washer between the star-washer and work, the cupped washer having a spring tongue over which the arms of the star-washer move when the latter is turned, teeth on the outer face of the star-washer indenting the nut under pressure, and means for locking the cupped washer to the bolt-shank when it is flattened.

5. In a nut lock, the combination with a bolt having a threaded shank, and a nut screwed thereon; of a star-washer next the nut, a cupped washer between the star-washer and work, the cupped washer having a spring tongue over which the arms of the star-washer move when the latter is turned, teeth on the outer face of the star-washer indenting the nut under pressure, and teeth in the opening of the cupped washer indenting the threads of the bolt when this washer is flattened under pressure.

6. In a nut lock, the combination with a bolt having a threaded shank, and a nut screwed thereon; of a star-washer next the nut, a cupped washer between the star-washer and work, the cupped washer having a spring tongue over which the arms of the star-washer move when the latter is turned, teeth in the opening of the cupped washer indenting the threads of the bolt when this washer is flattened under pressure, and fins projecting from the face of the cupped washer nearest the work, the fins being disposed near the periphery of this washer.

In testimony whereof I affix my signature.

FREDERICK L. HEMMER. [L. S.]